United States Patent [19]

Rand, III

[11] 3,873,690

[45] Mar. 25, 1975

[54] EQUINE INFECTIOUS ANEMIA VACCINE

[76] Inventor: James H. Rand, III, 25801 Lakeshore Dr., Euclid, Ohio 44110

[22] Filed: Jan. 23, 1974

[21] Appl. No.: 435,751

[52] U.S. Cl. .................................. 424/89, 424/86
[51] Int. Cl. ....................... A61k 23/00, C12k 5/00
[58] Field of Search ............. 424/12, 85, 86, 88, 89

[56] References Cited
UNITED STATES PATENTS
3,410,839  11/1968  De Carvalho...................... 260/112

OTHER PUBLICATIONS

McGuire et al., Fed. Proc. 31(2), 635 (1972), "Demonstration of Circulating Infectious Virus–Antibody Complexes in Equine Infectious Anemia."

McGuire et al. FEd. al. Fed. Proc. 29,435 (1970), "Immunugloblin Composition of the Hyper Gamma--Globulimmia of Equine Infectious Anemia."

*Primary Examiner*—Shep K. Rose
*Attorney, Agent, or Firm*—Baldwin, Egan, Walling & Fetzer

[57] ABSTRACT

A process is disclosed for producing a vaccine for use in immunizing horses against equine infectious anemia and for simultaneously obviating the transmission of the disease from a vaccinated horse to a non-vaccinated horse. The invention also includes the product derived from practice of the process and typical examples of the efficacy of the product are disclosed.

4 Claims, No Drawings

EQUINE INFECTIOUS ANEMIA VACCINE

BACKGROUND OF THE INVENTION

Equine infectious anemia is a serious disease in horses all over the world and is carried from horse to horse by insects, such as biting flies and/or mosquitoes. The disease seems to spread more rapidly in tropical and semi-tropical climates, but its incidence is not limited to such areas. Characteristic symptoms of this disease usually appear within three to four weeks after infection. These include fever usually from 102° F to 105° F and slightly higher, loss of hemoglobin within a few weeks in which the red blood cell count may go from ten million down to four or five million, extra nuclear bodies may appear in the white cells of the animal, visual hemorrhages in the eye may occur, icterus, hemorrhage in the mucus membrane at the base of the tongue and the conjunctiva, also there may be present edemas in visceral abdomen and extremities, and additionally there may become present espleno-megalia in the rectum of the animal.

Prior to the present invention a specific veterinary treatment was not known, since the care of the horses was limited to cleanliness and good nourishment, and for this reason the recovery of an infected animal was very slow, and in the worst of the cases, there was nothing else to do except sacrifice the animal affected when the illness had reached an advanced stage. The infection is easily transmitted from horse to horse, and great difficulty is encountered in arresting the spreading of the disease due to the fact that a horse may appear to recover from the disease and still remain a carrier and thus cause infection which is impossible to detect.

It has been discovered that equine infectious anemia is a viral illness produced by a particular species of the Hapten virus, which have protein coatings which are not antigenic, that is, they do not provoke the production of powerful antibodies due to their low molecular weight. The present invention utilizes an infected portion of the sick animal's body, the spleen being preferred, extracting the undenatured protein from the splenic material, coupling the same to a foreign protein such as rabbit gamma globulin by a chemical link such as bis-diazotized benzidine which increases the size of the molecular material so that it is capable of producing powerful antibodies.

The starting material for preparing the vaccine of this invention is preferably the spleen of one or more animals infected with equine infectious anemia. The spleens used may be from different animals, preferably horses, and they are mashed and centrifuged in order to obtain the antigen. The spleen is extracted at a cold temperature, around −4° C to −15° C, with a solvent of a fluoric hydrocarbon, trichlor-trifluorethane being preferred. The homogenization of the splenic material is conducted at high speed, 15,000 to 85,000 r.p.m. being preferred. After homogenization, the material is allowed to settle, which results in a top layer of nucleic acids and salt solution, a middle layer of protein mixed with the fluorocarbon, and a bottom layer of fluorocarbon and fat. The protein and fluorocarbon layer is separated and at least three and preferably about six to 10 homogenizations and separation cycles are generally employed to provide the preferred soluble antigen. This soluble protein and fluorocarbon material is then investigated by Frolin procedures to determine the percent protein therein. It is then mixed with a foreign protein, rabbit gamma globulin being preferred, such as Cohn Fraction II rabbit gamma globulin. The method for extracting Cohn Fraction II is cited by E. J. Cohn, Journal of American Cancer Society, Vol. 68, page 4,459, 1946. Using equal parts by weight of the protein content (calculated) of the protein-fluorocarbon material, and the same weight of the rabbit gamma globulin, these materials are slowly stirred together at ambient temperature while about 5.0 to 10.0 percent of the weight of gamma globulin of acidified bis-diazotized benzidine (7.6% being preferred) is slowly added. The addition of the bis-diazotized benzidine causes coagulation and upon further stirring a brownish protein precipitant is observed which is the equine infectious anemiadiazotized benzidine-gamma globulin complex. This complex was lyophilized to a powder and separated into one ml. lots.

Vaccination Procedures

In employing the vaccine prepared as set out above, and in testing its results, the immunizing antigen was injected into the horses intra-cutaneously. Generally the volume of the immunizing dose was 1 ml. of the Hapten protein-bis-diazotized benzidine-rabbit gamma globulin complex material which had been lyophilized as described hereinabove, which was reconstituted by mixing the same with approximately the same amount of a vehicle usually either incomplete Freunds adjuvant or buffered saline solution.

EXAMPLE I

Two healthy horses, which had previously been checked by the Coggins test and by the absence of clinical symptoms to be free of the equine infectious anemia (EIA), were used for this test. One of them received six injections at weekly intervals of 1 ml. of the vaccine (with the vehicle as described) and then two more injections of the same amount separated at intervals of one month. The other horse served as a control and had no injections of the vaccine. Complete hematological studies were practiced on both horses and in the one vaccinated there was observed the appearance of cellular immunity, judged by the inhibition proof of the migration of leucocytes or macrophages, and the lack of this in the control horse. When cellular immunity was established, both horses received a mortal dose of the EIA, namely, 10 ml. of a $10^{-6}$ dilution of the serum taken from a horse carrier of the EIA virus. The control horse, eleven days after the innoculation, presented typical symptoms of the disease, e.i., fever of 105° F, anemia, visceral edema, etc., and it had to be sacrificed. The vaccinated horse, on the contrary, did not show any signs of the illness 1 month later. A dose was then given this horse which was one thousand times greater than the mortal dose mentioned above of the serum of a horse carrier of the virus. No sign of the disease was observed a month later. Finally, this horse received a dose 1 million times greater of the virus, as mentioned above, with which it started to show a very slight form of some of the symptoms of the EIA illness.

EXAMPLE II

In this test, two healthy horses were round-robined by innoculating the serum from the first into the second, and from the second into the first, a procedure which was usually followed in order to ascertain the presence of any naturallyoccurring virus infection in these specific animals, as well as to rule out the presence of EIA virus. A few weeks later one of these horses was innoculated sub-cutaneously with 1 ml. of the coupled EIA vaccine, which had been prepared and lyophilized as above described. This coupled antigen had been reconstituted with about 1½ ml. of distilled water as a vehicle, and a smaller quantity of this reconstituted vaccine was checked for microbial sterility. This innoculation of the test horse was repeated 6 times at approximately 1 week intervals following which there were two more innoculations at monthly intervals. During the above periods, at innoculation dates, a complete hematologic study was run on blood specimens taken at weekly intervals from both horses. Along with the routine hematologies, a leucocyte migration technique was perfected and routinely established and checked. Starting about 2 weeks after the last weekly injection of the vaccine to the test horse, definitive inhibition of leucocyte migration became evident in the vaccinated horse's serum, whereas the non-vaccinated horse exhibited no change in the migration study. This inhibition phenomenon of the experimental horse continued to demonstrate cellular immunity at a marked rate up to the date of challenge innoculation as hereinafter mentioned. One month after the last of the two mentioned monthly innoculations of the test horse, 10 ml. of $10^{-6}$ dilution of a previously described mortal dose of the EIA serum of a horse carrier of the virus was injected. As of a month later, and thereafter, the vaccinated horse has not exhibited any sign or symptom of the EIA disease. His blood hematology is perfectly normal, and all of his reactions, temperature, and other clinical signs are normal as well. The non-vaccinated horse was challenged with 10 ml. of $10^{-6}$ dilution of the mortal dose of EIA serum from an infected horse about a week after the challenge to the test horse, and had to be euthanized about eleven days later when the horse had a fever of 105° F and clinical signs of the disease were painfully advanced.

EXAMPLE III

In this test, thirteen horses were round-robined as mentioned above to ascertain the presence of any naturally-occurring virus infections among these specific animals, as well as to rule out the presence of EIA virus in any of them. Seven of these horses chosen at random were protected by innoculating them with 1 ml. of the coupled antigen reconstituted with a vehicle as hereinbefore described, the innoculations being six innoculations at weekly intervals followed by two injections at monthly intervals. Then, all 13 of the horses were given the mortal dose of EIA virus from the serum of an infected carrier as hereinabove described. All six of the horses not protected died. None of the previously vaccinated and protected horses came down with the EIA disease or any symptoms of the disease. Blood from the cured horses was injected into normal healthy horses and none of these normal horses developed the EIA disease.

EXAMPLE IV

Seven normally healthy horses were first round-robined by innoculating the serum from the first into the second, from the second into the third, etc., ending with serum from the seventh into the first. This obviated the presence of any naturallyoccurring virus infections among these specific animals, as well as ruling out the presence of EIA virus in any of them. One of the horses was selected at random as a control. The other six horses were innoculated with 1 ml. of the coupled EIA vaccine in the customary vehicle. The innoculations were repeated at six weekly intervals followed by two monthly intervals as previously described in other cases. Weekly hematologic studies were run on blood specimens from all seven of the horses until definitive inhibition of leucocyte migration became evident in the serum of the six vaccinated horses. Then all seven of the horses were given 10 ml. of $10^{-6}$ dilution of a normally lethal dose of EIA serum from a carrier horse. The innoculations were sub-cutaneous as previously mentioned. During the succeeding month, the six horses on prophylactic study came through without any indications or clinical signs of the EIA disease. The control horse expired. The prophylactically vaccinated horses have been challenged with various dilutions of the positive EIA serum and even using the full strength of the virus serum, none of the challenged horses showed any signs of the EIA disease, such signs usually appearing on or about the third week following infection. One of the above proven positive animals has had its serum passed to a recipient healthy horse and the incubation period of over a month has long since passed and the recipient shows no clinical signs of the EIA disease.

Approximately 100 normal horses have been given the vaccine against EIA disease prepared according to the present invention and no clinical symptoms have appeared over a long period of time well beyond the normal incubation period. Approximately 10 race horses which were clinically determined to be terminally ill from the EIA disease were treated by the vaccination of each of them with 1 ml. of the coupled antigen, lyophilized as above described, and reconstituted with approximately the same amount of one of the vehicles hereinabove mentioned, the innoculations being repeated for 6 weekly periods followed by 2 monthly periods and within 90 days thereafter, they had fully recovered from the EIA disease and were able to participate in horse races again. Putting horses under stress with the EIA disease nearly always kills them, but none of these horses died and some even won their races.

The rabbit gamma globulin mentioned herein for the production of the EIA vaccine may be substituted by gamma globulin from lambs, goats or any other gamma globulin other than from horses, but that from rabbits is preferred because it is cheaper and more readily available, and in standardized form.

The disease mentioned herein as equine infectious anemia is also sometimes known as "swamp fever."

The coupling agent used to couple the gamma globulin to the virus protein may be any one of the following: bis-diazotized benzidine, m-xylilene diisocyanate, tolulene-2,4 diisocyanate, bycyclohexile carbodiimide, 3,3'-diamethylbenzidine, 3,3'-dichlorobenzidine, and a,a'-bis-p-toludine.

What is claimed is:

1. A process of producing a vaccine for treating horses against equine infectious anemia, consisting of the steps of:
    a. mashing an organ of a sick animal contaminated with the virus of equine infectious anemia;
    b. extracting the mashed matter by means of trichlorotrifluorethane in the cold at −4° C to −15° C centrifuged at 15,000 to 85,000 r.p.m. to obtain the undenatured protein of the virus;

c. mixing a given weight of said protein with substantially the same weight of a gamma globulin foreign to horses while stirring with a coupling agent chosen from the group consisting of bisdiazotized benzidine, m-xylilene diisocyanate, tolulene-2, 4-diisocyanate, bycyclohexile carboiimide, 3,3'-diamethlybenzidine, 3,3'-dichlorobenzidine, and a,a'-bis-p-toludine, in an amount of approximately 7.6 percent of said given weight to obtain a precipitate which is the desired antigen for the vaccine; and d. lyophilizing said precipitate to a powder.

2. The process of claim 1 wherein said gamma globulin in step (c) is rabbit gamma globulin and the coupling agent in steps (c) is bis-diazotized benzidine.

3. A process as defined in claim 1 including the step of:

e. reconstituting the antigen of step (c) by mixing said powder with approximately an equal volume of a vehicle chosen from the group consisting of distilled water, buffered saline solution and incomplete Freund's adjuvant to prepare the vaccine for injection into a horse.

4. The product produced by the process of claim 1.

* * * * *